United States Patent
Stehr (10) Patent No.: US 6,854,628 B1
(45) Date of Patent: Feb. 15, 2005

(54) HANDLEBAR TIMING DEVICE

(76) Inventor: Jeff G Stehr, 5716 Yosemite Dr., San Berardino, CA (US) 92407

( * ) Notice: Subject to any disclaimer, the term of this patent is extended or adjusted under 35 U.S.C. 154(b) by 123 days.

(21) Appl. No.: 10/403,892

(22) Filed: Mar. 31, 2003

(51) Int. Cl.$^7$ .................................................. B62J 7/06
(52) U.S. Cl. ...................................... 224/413; 224/420
(58) Field of Search .................................. 224/413, 420

(56) References Cited

U.S. PATENT DOCUMENTS

| 490,750 | A | | 1/1893 | Kuhn | |
|---|---|---|---|---|---|
| 503,058 | A | | 8/1893 | McGriff | |
| 1,262,040 | A | | 4/1918 | Hall | |
| 1,446,613 | A | | 2/1923 | Bush | |
| 2,588,671 | A | * | 3/1952 | Tringali | 224/454 |
| 3,125,884 | A | | 3/1964 | Davies | |
| 3,708,750 | A | | 1/1973 | Bucks et al. | |
| 4,179,877 | A | | 12/1979 | Wilson et al. | |
| 4,596,370 | A | | 6/1986 | Adkins | |
| 4,618,081 | A | | 10/1986 | Miree | |
| 4,819,217 | A | | 4/1989 | Houlihan | |
| 4,981,242 | A | | 1/1991 | Rogowski | |
| 4,981,243 | A | * | 1/1991 | Rogowski | 224/431 |
| 5,114,060 | A | * | 5/1992 | Boyer | 224/413 |
| 5,395,018 | A | * | 3/1995 | Studdiford | 224/420 |
| 6,305,241 | B1 | * | 10/2001 | Masui et al. | 74/551.8 |
| 6,378,815 | B1 | | 4/2002 | Lee | |
| 6,390,429 | B1 | * | 5/2002 | Brincat | 248/309.1 |
| 6,557,437 | B2 | * | 5/2003 | Masui et al. | 74/551.8 |

* cited by examiner

Primary Examiner—Stephen K. Cronin
(74) Attorney, Agent, or Firm—Michael I Kroll (57) ABSTRACT

The present invention 10 discloses a stopwatch 19 seated in a molded cavity 36 of a compressible foam-like block of material 18 enclosed by a cover 20 having a transparent element 22 to hold the stopwatch 19 within the cavity wherein the block of material is mounted to the handlebars 16 of a motorcycle. The stopwatch 19 has electrical connection means 24 with an on/off switch 26 that is mounted near the handlebar grip 28 whereby the stopwatch can be started and stopped by the rider using their thumb. Positioned within the top of the material 18 is the cavity 36 having an angular base for the placement therein of a timepiece 19 using mating hook and loop material 32 wherein the angular base positions the timepiece at an angle so that the timepiece is easily viewable by the rider. Also shown is a protective cover element 20 having mating hook and loop material 30 thereon forming means for closure that is wrapped around the foam-like material 18. The timepiece 19 may also have a lighted face for use in the dark.

14 Claims, 10 Drawing Sheets

HANDLEBAR TIMING DEVICE

BACKGROUND OF THE INVENTION

1. Field of the Invention

The present invention relates generally to time pieces and, more specifically, to a stopwatch enclosed within a housing that is mounted to the handlebars of a motorcycle having a switch mounted on either side of handlebars for starting and stopping the stopwatch.

The handlebar stopwatch provides means for a motorcycle rider to accurately time himself or herself during practice by pressing a switch mounted to handlebars for starting and stopping the stopwatch. It can also be used when riding for exercise by setting it on 15, 30, 45 minute extension intervals. Riders can also compare times with each other and see where they stand in comparison with the track record or their best time. Riders should be able to scroll through each lap time by pressing another button on the time piece.

2. Description of the Prior Art

There are other timing devices designed for time keeping. Typical of these is U.S. Pat. No. 490,750 issued to Kuhn on Jan. 31, 1893.

Another patent was issued to McGriff on Aug. 8, 1893 as U.S. Pat. No. 503,058. Yet another U.S. Pat. No. 1,262,040 was issued to Hall on Apr. 9, 1918 and still yet another was issued on Feb. 27, 1923 to Bush as U.S. Pat. No. 1,446,613.

Another patent was issued to Davies on Mar. 24, 1964 as U.S. Pat. No. 3,125,884. Yet another U.S. Pat. No. 3,708,750 was issued to Bucks, et al., on Jan. 2, 1973. Another was issued to Wilson, et al., on Dec. 25, 1979 as U.S. Pat. No. 4,179,877 and still yet another was issued on Jun. 24, 1986 to Adkins as U.S. Pat. No. 4,596,370.

Another patent was issued to Mire on Oct. 21, 1986 as U.S. Pat. No. 4,618,081. Yet another U.S. Pat. No. 4,819,217 was issued to Houlihan on Apr. 4, 1989. Another was issued to Rogowski on Jan. 1, 1991 as U.S. Pat. No. 4,981,243 and still yet another was issued on Apr. 30, 2002 to Lee as U.S. Pat. No. 6,378,815.

The combination with the handle rod C, of the two-part clamp detachably secured thereto, the flat spring arm E having a portion lying flat on and held to the tipper part of the said clamp and curved as shown and its other end curved and extended at right angles to the length of the arm to conform to the curvature of a clock and to partially embrace the same, and the clock sander which the spring arm passes and to which it is secured, substantially as shown and described.

An attachment to a bicycle for holding articles, consisting of a device constructed of wire or other suitable material and having a frame to embrace the handle of the bicycle and a clip to embrace the post or standard thereof, said clip terminating in screw threaded extensions, and a clamping plate and thumb-nuts for forcing the plate against the post or standard, substantially as and for the purpose set forth.

Means for indicating the elapsed time during which a machine is in motion, comprising a clock mechanism, a shaft driven by the machine, a friction clutch having one member mounted on said shaft, a detent device for said clock mechanism operatively connected with the other clutch member; and a coiled spring normally holding said decent device in operative position.

In a clock stopping device to cooperate with a vehicle, the combination of a member adapted to, be actuated through the agency of the running gear of the vehicle, yielding stop mechanism for stopping the clock, and means positively actuated by said member and engaging the stop means to actuate to actuate the same.

An elapsed-time testing apparatus for association with a vehicle, said apparatus comprising a road engaging wheel other than a wheel of the vehicle and provided with means far ready attachment to and detachment from the vehicle, traversal responsive means comprising a screw shaft and means for communicating motion from said wheel to said shaft, traveling nut means operably associated with said shaft and traversable therealong between predetermined limits, a normally closed switch cooperating with said traveling nut means, a normally open second switch carried on said apparatus, said second switch balanced to readily respond to the inertial force exerted by said vehicle from a standing start, an electrically controlled time indicating instrument, and an electrical circuit including said instrument and said switches in series, whereby in response to the initial forward lurch of said vehicle from a standing start said second switch will be operated to its circuit closing position to cause the operation of said time indicating instrument until said first recited switch is operated to its open circuit position by said traveling nut means to terminate operation of said time indicating instrument to indicate the elapsed time of traversal of said vehicle over a measured course An electronic apparatus for measuring the time required for a vehicle to travel a predetermined distance such as a quarter mile. The exemplary embodiment described comprises pulse generating means for producing a pulse for each increment of distance traveled in combination with an integrating means for accumulating such pulses and producing a stop count signal when the output of the integrating means reaches a predetermined level. By adjusting a duty cycle of the individual pulses input to the integrating means, the predetermined point at which the stop count output is produced may be made to correspond to a desired predetermined value of traveled distance. Clock pulses are counted by a digital counter from a time determined by either manual or automatic start means until said stop count signal is produced at which time the counter is adapted to hold its contents until being reset. An indicator is also associated with the counter for visually displaying the contents of the counter indicating the elapsed time required for the vehicle to travel the predetermined distance as determined by the pulse width adjustment.

A mounting structure incorporated into the dashboard of an automotive vehicle or the like for removably supporting a portable, self-contained, battery operated alarm clock to enable the clock to be easily mounted in the dashboard and just as easily removed therefrom to enable the clock to be used in the vehicle in a customary manner and removed therefrom and carried to any desired location for use as a portable alarm clock having general utility. The clock is especially useful by travelers since it can be taken out of the automobile and into the motel or hotel room so that it can be used as an alarm clock. The mounting structure and clock are uniquely associated so that the clock may be easily inserted but yet securely retained in the vehicle dashboard even when traversing rough or uneven roadways and the like with a manually manipulated structure enabling easy removal of the clock from its secure position in the dashboard.

A container holder for clamping to a tubular support member. The container holder comprises a base member for supporting on its upper surface a tubular container open at its upper end. The lower surface of the base member includes an adjustable clamp for adjustably gripping different sized tubular supports. The container holder is either formed of rigid or flexible insulating material. When rigid, the container holder, base and adjustable clamp are formed as an integral unit. When formed of flexible insulating material, the container holder can be fixedly attached to the upper surface of the base member or removably attached by means of Velcro.RTM. hook-and-eye fastening material. The clamping means may be located on the rigid container intermediate its ends.

Apparatuses for mounting flashlights to bicycles have concave surfaces for directly supporting flashlights and which are releasably held thereto by Velcro type material bearing straps. The apparatuses also have semi-cylindrical channels adapted to the placed in mating contact with bar elements of the bicycles and releasably held thereto by other Velcro type material bearing straps.

A bicycle handlebar holder for a wrist instrument with pushbuttons and electrical contact means, said holder having a holder body, a cover which is pivotable with respect to the body and defining therewith a receptacle for holding the case of said wrist instrument when the cover is closed, a clamp for attaching the body to a bicycle handlebar, a plurality of electrical contacts disposed in the body and opening into the receptacle, and at least one manual actuator disposed in the cover and adapted to be operated from outside of the cover and having a portion movable inside said receptacle which is disposed to depress a pushbutton when the actuator is operated.

An audio equipment carrier assembly to be mounted on the handlebars or other like support members of various two and three wheel vehicles. The preferred embodiment includes a carrier assembly body adapted to receive and contain a Walkman-style personal radio having headphones which are very popular. Bicyclists and the like which desire to listen to music while riding may use the equipment carrier of the present invention to hold the radio or other audio equipment on the front of the bicycle while wearing the headphones for the equipment, which is connected to the audio source.

The mounting assembly includes a shaft having a planar member mounted on a top end of the shaft. The planar member is preferably mounted so it pivots with respect to the shaft. The shaft is insertable in a hollow cylinder on a motor vehicle. In the case of a motorcycle, a portion of the shaft is inserted in a steering stem of a steering head. A plurality of o-rings, attached to a portion of the shaft inserted in the cylinder, secure the mounting assembly in place. A Velcro TM. piece, fixed to a top surface of the planar member, clasps to a corresponding Velcro TM. piece of an electronic device placed on the mounting assembly.

While these timing devices may be suitable for the purposes for which they were designed, they would not be as suitable for the purposes of the present invention, as hereinafter described.

SUMMARY OF THE PRESENT INVENTION

The present invention discloses a device mounted to motorcycle handlebars. The present invention comprises a stopwatch seated in a molded cavity of a compressible foam-like material enclosed by a cover having a transparent element to hold the stopwatch within the cavity and to protect the stopwatch from the elements, as well as making it easily viewable. The stopwatch has electrical connection means with an on/off switch that is mounted on either side of handlebars whereby the stopwatch can be started and stopped by the rider using their thumb. The compressible protective foam block with a longitudinal throughbore and a slit or slot through the foam-like material provides access to the throughbore whereby the foam-like material can be mounted to motorcycle handlebars. Positioned within the top of the material is a cavity having an angular base for the placement therein of a timepiece and where the angular base positions the timepiece at an angle so that the timepiece is easily viewable by the rider. The timepiece can function as a watch and has a stopwatch and can also be lighted for nighttime use.

A primary object of the present invention is to provide means for starting and stopping a timing device by a rider of a motorcycle.

Another object of the present invention is to provide a stopwatch that is easily viewable to the motorcycle rider during the timing process.

Another object of the present invention is to provide means for mounting a stopwatch to the handlebars of a motorcycle.

Another object of the present invention is to provide a switch mounted to the handlebars of a motorcycle for starting and stopping a stopwatch.

Yet another object of the present invention is to provide a housing for a stopwatch.

Still yet another object of the present invention is to provide a housing mounted to the handlebars of a motorcycle.

Another object of the present invention is to provide a housing comprised of a compressible foam-like material.

Another object of the present invention is to provide a housing having a cavity for the placement therein of a stopwatch.

Yet another object of the present invention is to provide a protective element for said housing.

Still yet another object of the present invention is to provide a portion of said protective element with a transparency for viewing the stopwatch.

Additional objects of the present invention will appear as the description proceeds.

The present invention overcomes the shortcomings of the prior art by providing a stopwatch enclosed within a housing that is mounted to the handlebars of a motorcycle having a switch mounted on either side of handlebars for starting and stopping the stopwatch. Whereby motorcycle riders can time themselves during practice by starting and stopping the stopwatch using a switch mounted on the handlebars. They can also find their average lap time by scrolling through the times using a button on the timepiece itself.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

List of Reference Numerals

With regard to reference numerals used, the following numbering is used throughout the drawings.

10 present invention
12 motorcycle
14 rider
16 handlebars
18 foam
19 stop watch
20 cover
22 transparent element
24 electrical connection means
26 on/off switch
28 throttle
30 mating hook and loop material for cover
32 slot
34 throughbore
36 recess
38 mating hook and loop material for watch
40 angular base
42 aperture
44 alternate embodiment

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
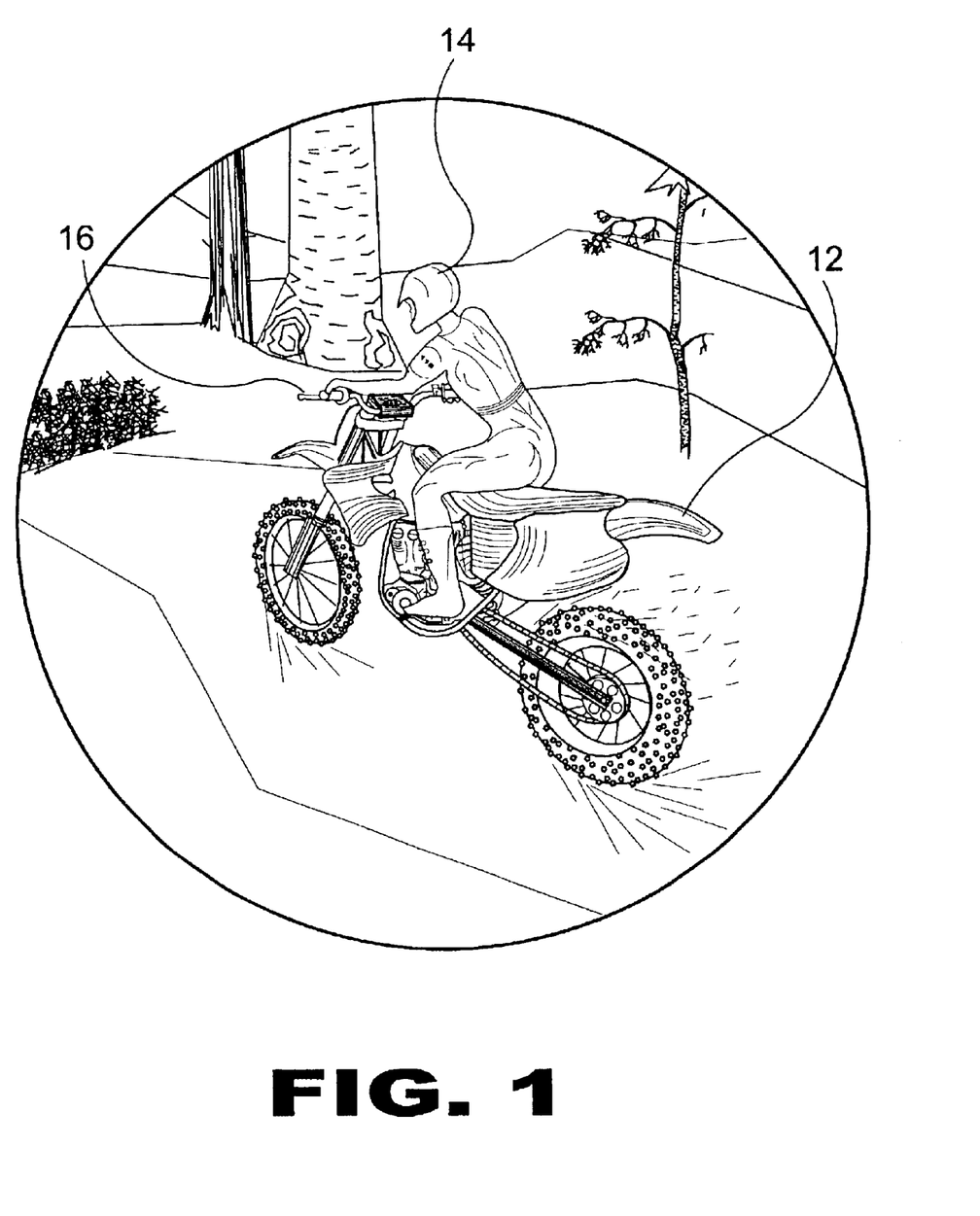
FIG. 1 is an illustrative view of the present invention in use.

Turning to FIG. 1, shown therein is an illustrative view of the present invention in use. Shown is a motorcycle or other wheeled vehicle 12 and a rider 14 using the present invention to accurately time the distance between a starting point and an ending point using a stopwatch that is mounted in a housing releasably attached to the motorcycle handlebars 16 in a molded cavity of a foam protective element that is easily viewable. The stopwatch also has an easily accessible switch on the handlebars for starting and stopping the stopwatch.

Figure 2:
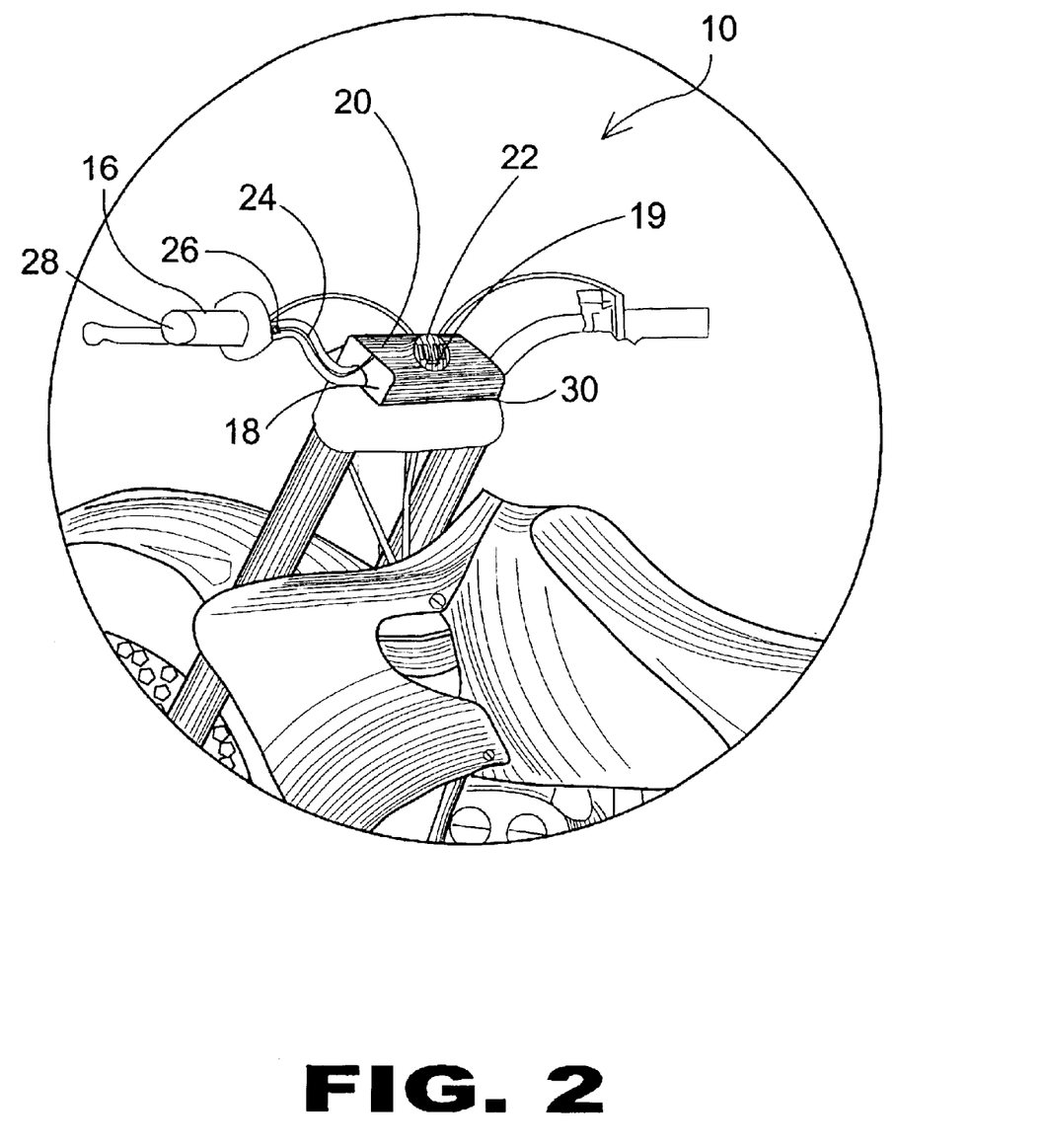
FIG. 2 is an enlarged view of the present invention mounted to motorcycle handlebars.

Turning to FIG. 2, shown therein is an enlarged view of the present invention 10 mounted to motorcycle handlebars 16. Shown is the present invention 10 comprising a timer or timepiece 19, e.g., a stopwatch, seated in a molded cavity of a compressible foam-like material 18 enclosed by a pliable cover 20 having a pliable transparent element 22 to hold the stopwatch 19 within the cavity and to protect the stopwatch from the elements, as well as making it easily viewable. The stopwatch 19 has electrical connection means 24 with an on/off switch 26 that is mounted on the handlebar 28 whereby the stopwatch can be started and stopped by the rider using their thumb. Also shown is a hook and loop material cover connecting member 30.

Figure 3:
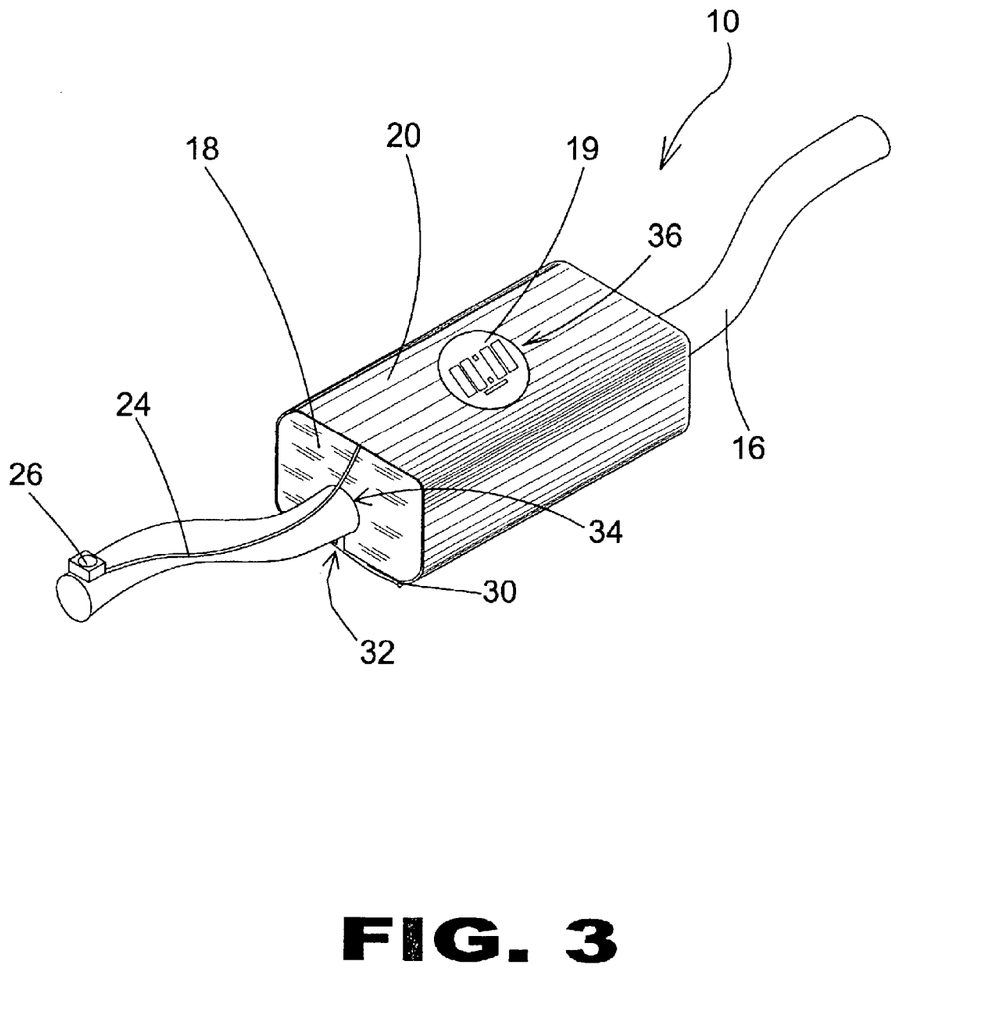
FIG. 3 is a partial view of the handlebars having the present invention mounted thereon.

Turning to FIG. 3, shown therein is a partial view of the handlebars 16 having the present invention 10 mounted thereon. Shown is the present invention 10 mounted on the motorcycle handlebars 16. The compressible foam-like material 18 has a slot 32 and throughbore 34 for mounting the foam-like material 18 to an existing handlebar 16. Once placed thereon the watch 19 is positioned within the recess or cavity 36 and the protective cover element 20 is fastened over the material 18 having mating hook and loop fastening members 30. The switch 26 and wire 24 are run along the handle 16 and fastened to a predetermined position selected by the user.

Figure 4:
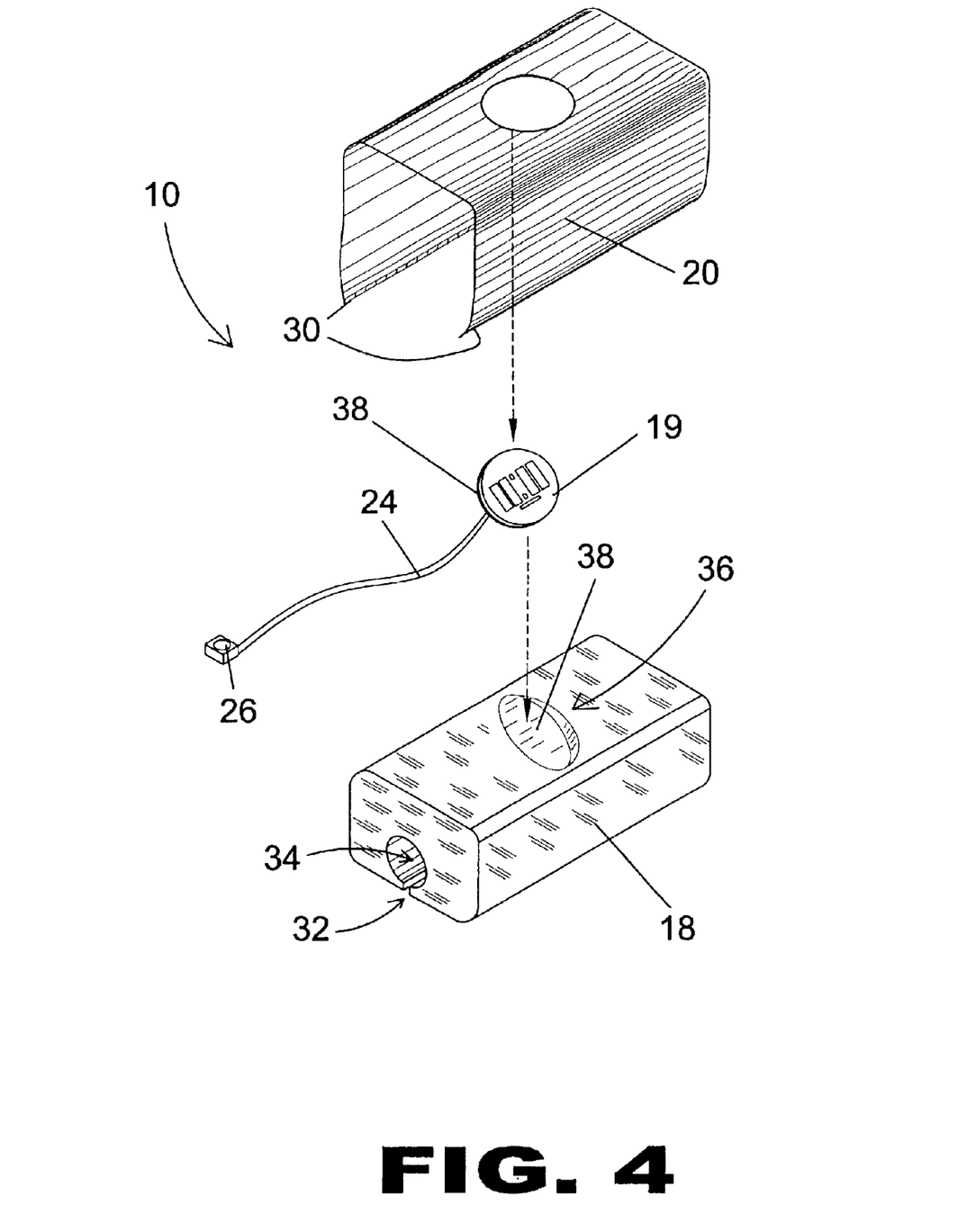
FIG. 4 is an exploded view of the present invention.

Turning to FIG. 4, shown therein is an exploded view of the present invention 10. Shown is the compressible protective foam block 18 with a substantially horizontally disposed longitudinal throughbore 34 and a slit or slot 32 running through the foam-like material 18 longitudinally along the throughbore providing access to the throughbore whereby the foam-like material can be mounted to motorcycle handlebars. Positioned within the top of the material 18 is a recess or cavity 36 having an angular base for the placement therein of a timepiece 19 and where the angular base positions the timepiece at an angle so that the timepiece is easily viewable by the rider. The timepiece 19 can function as a watch and has a stopwatch and can also be lighted for nighttime use. Also shown is a protective cover element 20 having mating hook and loop material 30 thereon forming means for closure that is wrapped around the foam-like material 18. The stopwatch 19 has an electrical connection 24 to a switch 26 that is advantageously positioned near the handlebar grip to start and stop the timepiece 19. Mating hook and loop material 38 is shown on the back or lower side of watch 19 for mounting it in the cavity 36.

Figure 5:
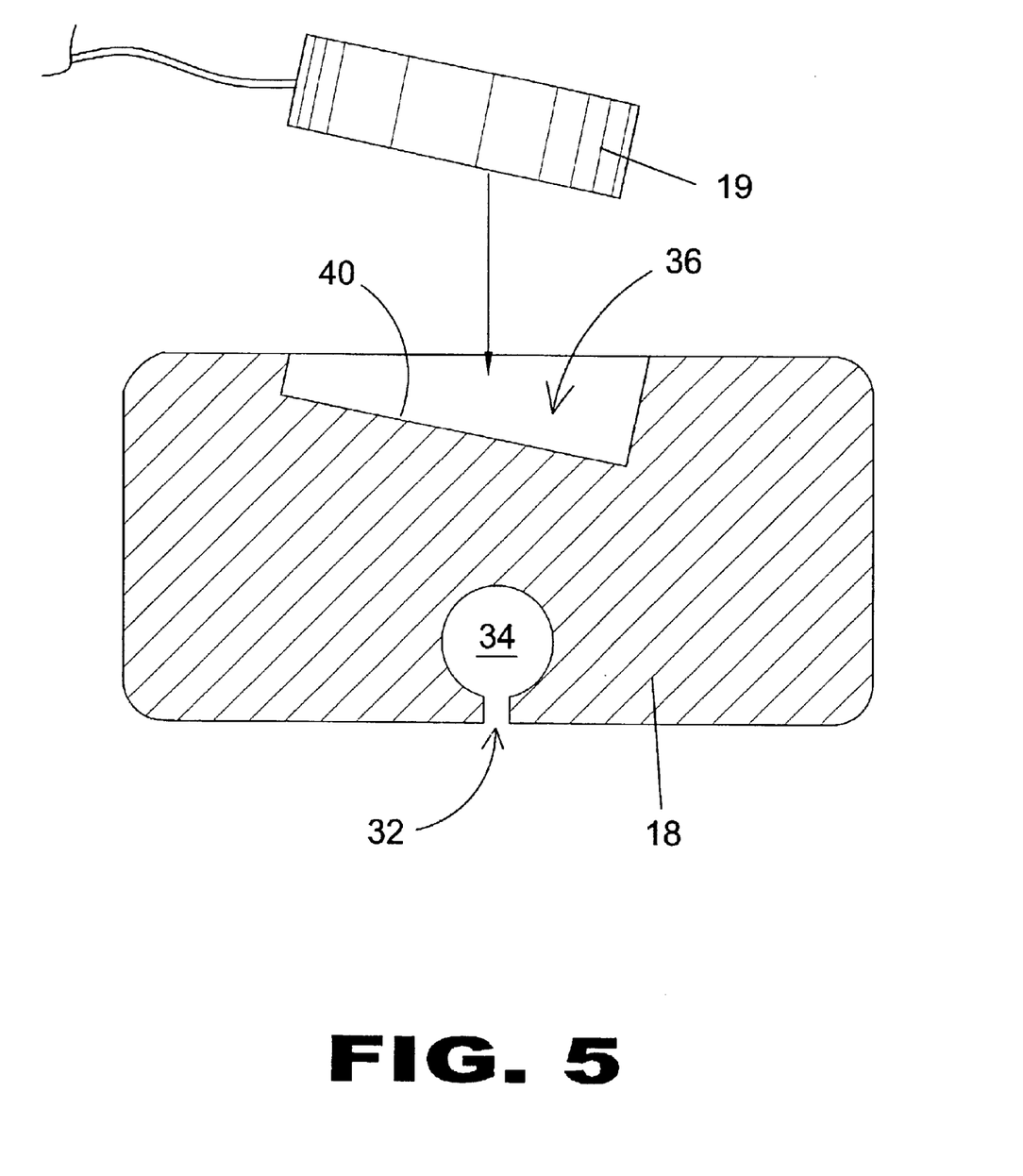
FIG. 5 is a sectional view of the foam-like housing.

Turning to FIG. 5, shown therein is a sectional view of the foam-like housing 18. Shown is the compressible foam block 18 with a longitudinal throughbore 34 and a slit 32 through the foam-like material providing access to the throughbore. Also shown is a cavity 36 having an angular base 40 for the placement of the stopwatch 19. The angular base 40 positions the stopwatch 19 at an angle so that the stopwatch is easily viewable to the rider.

Figure 6:
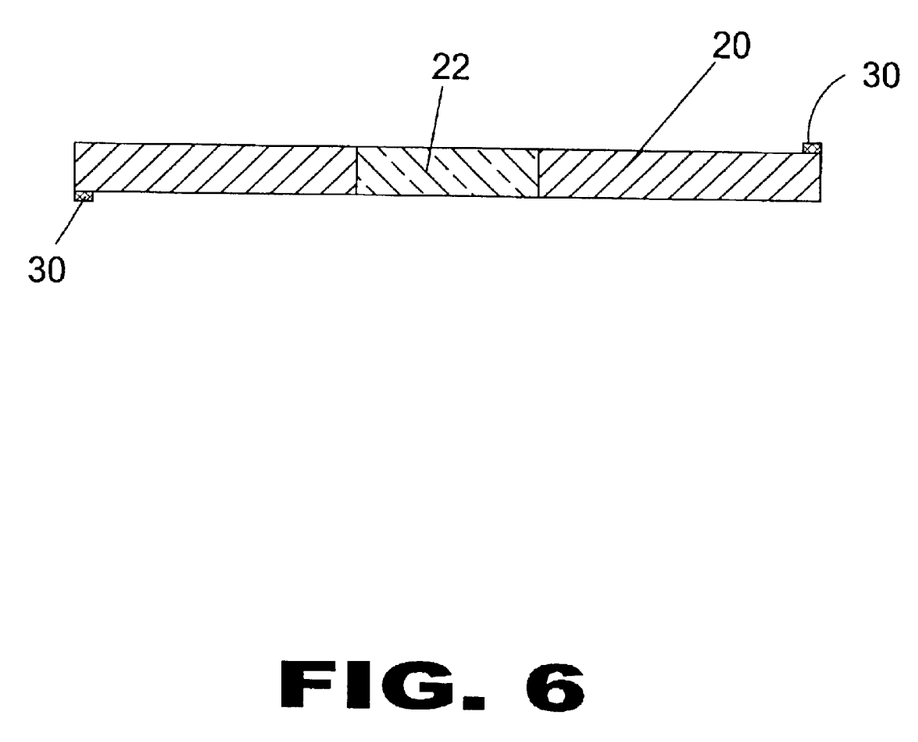
FIG. 6 is a sectional view of the protective element.

Turning to FIG. 6, shown therein is a sectional view of the protective cover element 20. Shown is the protective element 20 having a transparent portion or member 22 forming an integral member of the protective element and wherein the transparent member serves to provide a view port for the stopwatch and a retaining element for holding the stopwatch within the foam-like housing cavity. Also shown are mating pieces of hook and loop material 30 positioned at each distal end of the protective element 20 forming fastening means for the protective element once placed over the foam-like housing.

Figure 7:
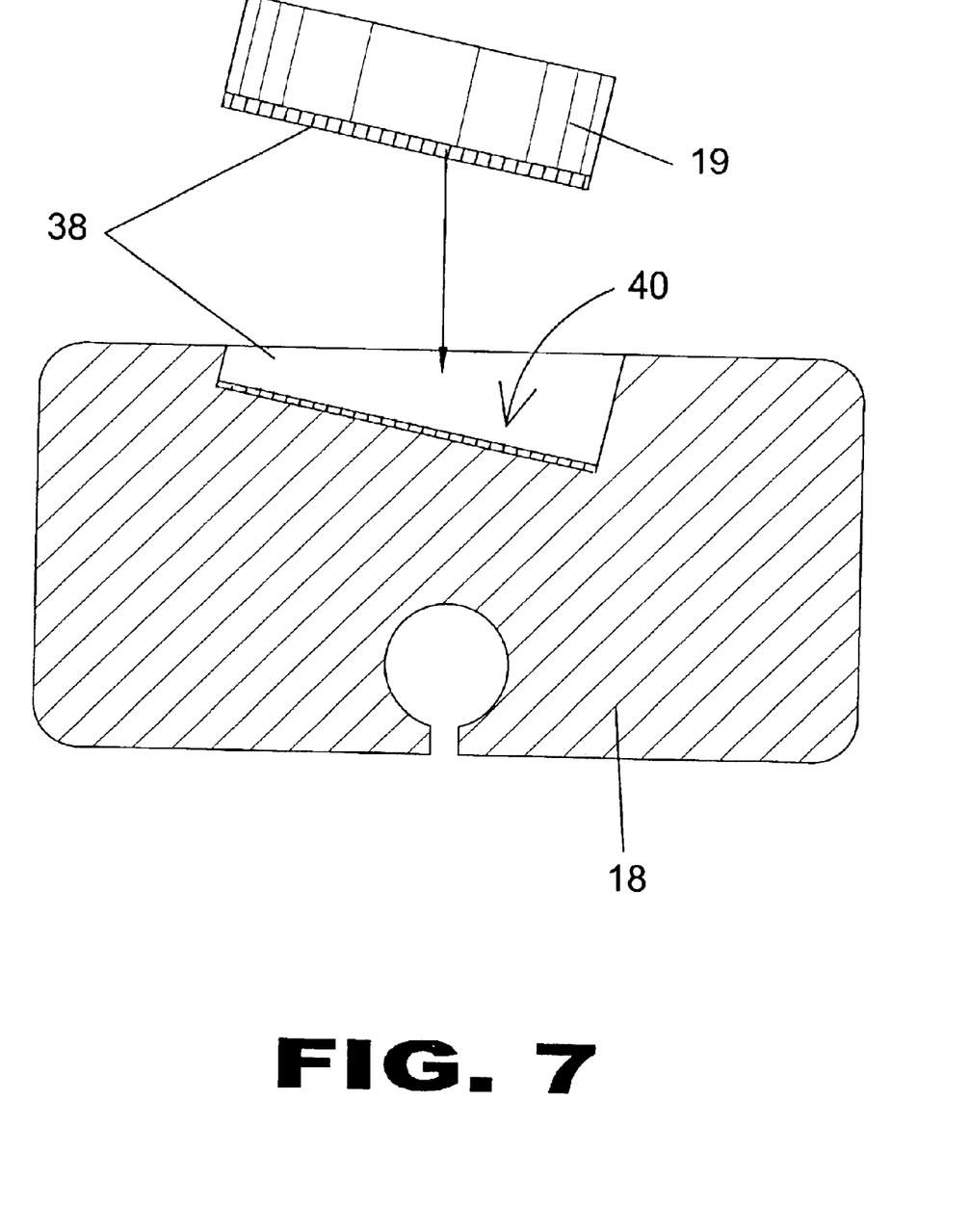
FIG. 7 is a sectional view of the present invention.

Turning to FIG. 7, shown therein is a sectional view of the present invention. Shown is the foam-like housing 18 of the present invention having an additional element in the form of mating pieces of hook and loop material 38 with one piece fixed to the cavity base 40 and the other on the backside of the stopwatch 19 which will allow selective removal of the stopwatch while also binding the stopwatch to the base of the cavity. The removal of the stopwatch 19 would be periodically required to change the batteries.

Figure 8:
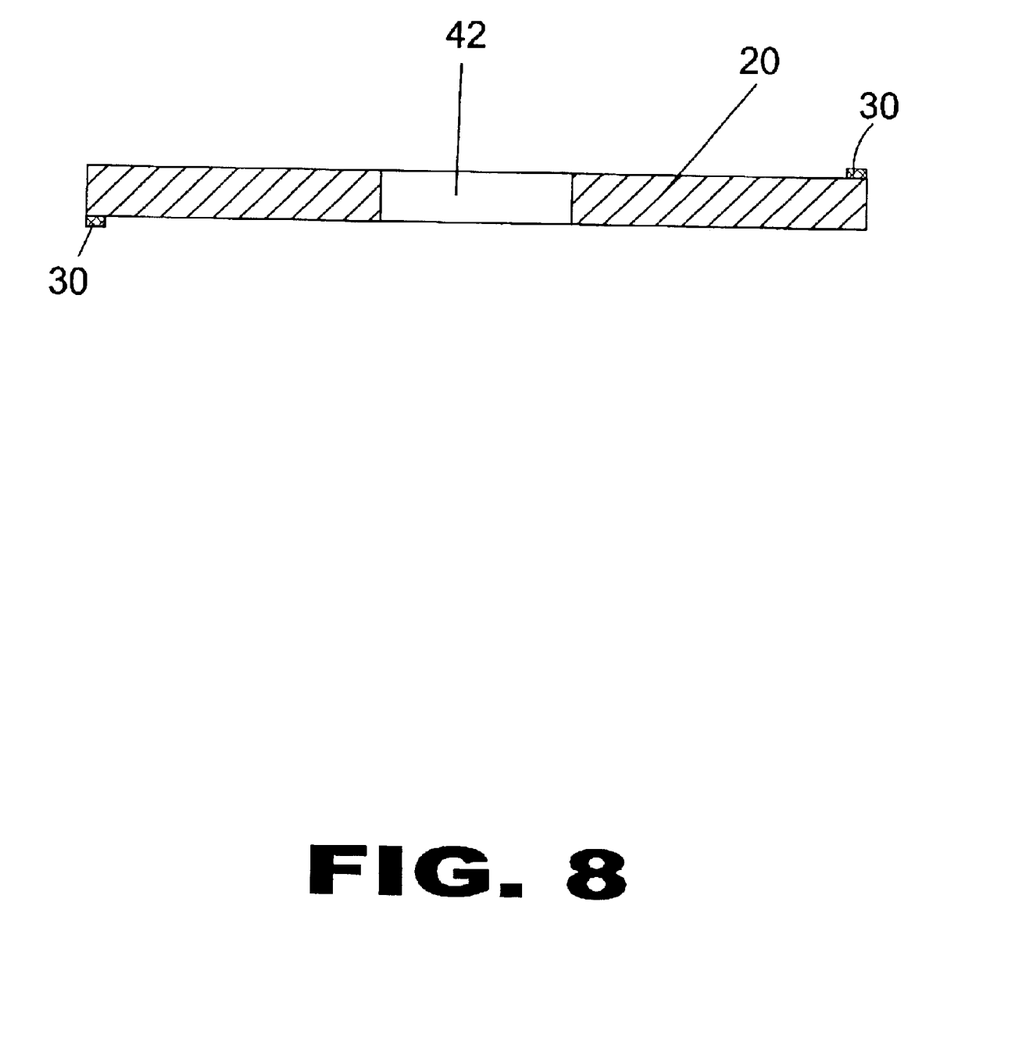
FIG. 8 is a sectional view of the protective element.

Turning to FIG. 8, shown therein is a sectional view of the protective element 20. Shown is the protective element having an additional element in the form of an aperture 42 forming an integral part of the protective element 20 and wherein the aperture provides means for removing the stopwatch without having to remove the protective element. Also shown are mating pieces of hook and loop material 30 positioned at each distal end of the protective element 20 forming fastening means for the protective element once placed over the foam-like housing.

Figure 9:
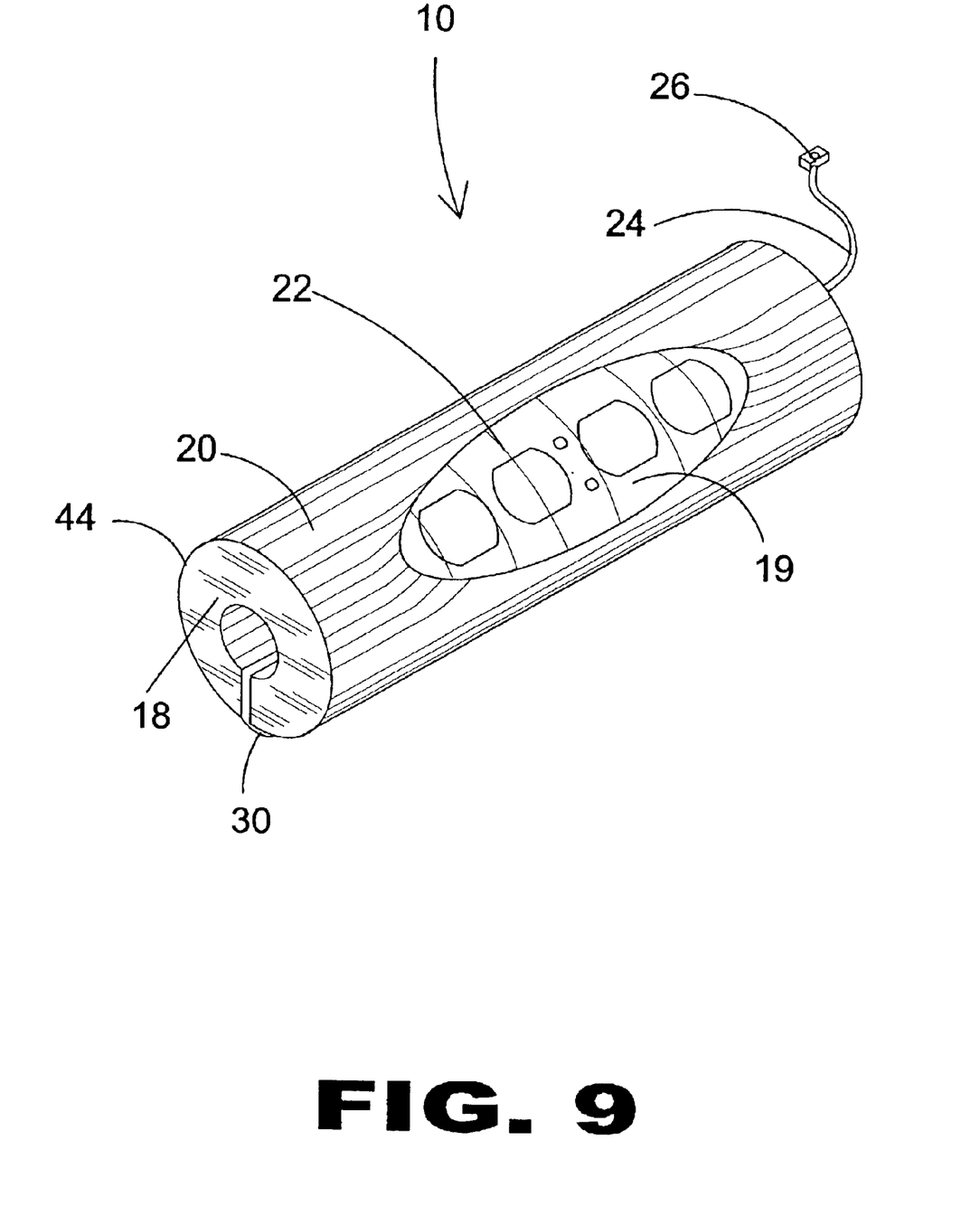
FIG. 9 is a perspective view of another additional element of the present invention.

Turning to FIG. 9, shown therein is a perspective view of another additional element of the present invention 10. Shown is an additional element 44 of the present invention 10 that would be applicable on the horizontal reinforcement bar of a different style handle bar used on some motorcycles. The elements of this embodiment are similar to those previously disclosed.

Figure 10:
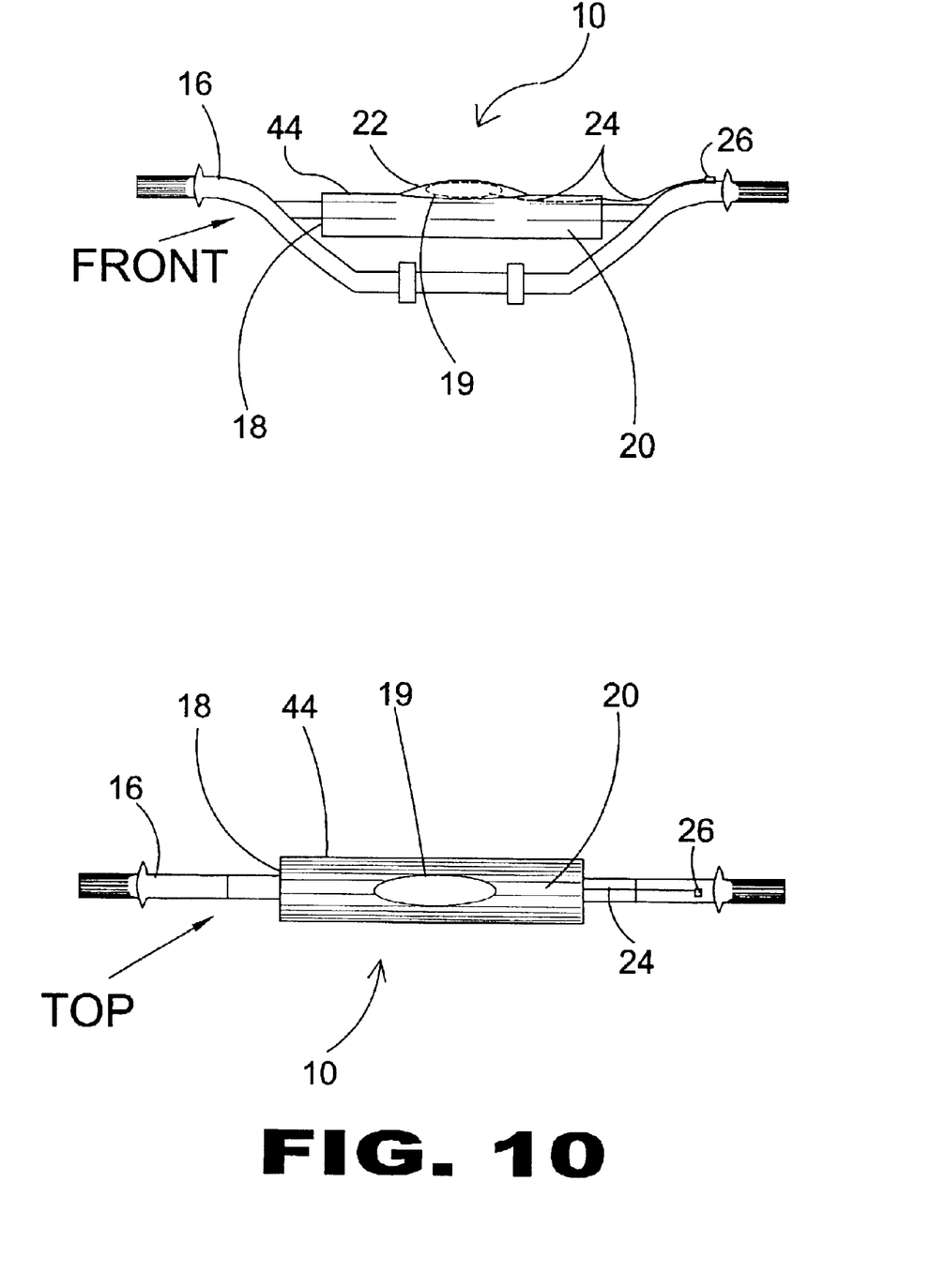
FIG. 10 is a front and top view of an additional element of the present invention.

Turning to FIG. 10, shown therein is a front and top view of an additional element 44 of the present invention 10. FIG. 10 shows that the present invention 10 is not limited in any way by the type of motorcycle handlebars 16 available at the present time but can be adapted to various styles of motorcycle handlebars. The elements of this embodiment are similar to those previously disclosed.

I claim:

1. A timer for attachment to the handlebars of a wheeled vehicle, comprising:
   a) a wheeled vehicle having handlebars thereon for attachment thereto of the timer, wherein the handlebars have first and second opposing ends wherein at least one end has a grip thereon, wherein a throttle is disposed on said grip of said handle bar;
   b) a block of pliable material disposed on said handlebars, wherein the timer is disposed on said block, said block having a top, a bottom, a pair of ends, and a pair of sides, said top of said block having a recess therein, said recess for receiving the timer therein;
   c) a timepiece being disposed in said recess of said block, said timepiece having a front face and a back side; and,
   d) a first cover disposed around said timepiece and said block, said first cover being complementarily sized as said block, said first cover having first and second opposing ends along with a pair of sides, said first cover having an aperture therein, wherein said aperture is complementarily sized as said timepiece to permit the timepiece to be viewed through the aperture, further comprising means for connecting said first and second opposing ends of said first cover to permit the first cover to be secured around said block.

2. The timer of claim 1, wherein said block has a substantially horizontal throughbore therein, said throughbore for receiving said handlebars therein to permit the block to be attached to the handlebars.

3. The timer of claim 2, wherein said block has a slit therein, said slit extending from an outer surface of said block to a wall of said throughbore for receiving the handlebars therein, said slit running longitudinally along said throughbore to permit the block to be attached to the handlebars.

4. The timer of claim 3, wherein said recess is disposed at an angle to permit the timepiece to be read by a rider of the wheeled vehicle, said recess having a bottom therein.

5. The timer of claim 4, wherein said means for connecting said first and second opposing ends of said first cover comprise a first mating hook and loop material being matingly disposed on said first and second opposing ends of said first cover.

6. The timer of claim 5, further comprising a second transparent cover disposed over said aperture in said first cover, said second cover being pliable, to permit the timepiece to be viewed by a rider of the wheeled vehicle.

7. The timer of claim 6, wherein said second transparent cover is integrally constructed with said first cover.

8. The timer of claim 7, further comprising a second mating hook and loop material member being matingly disposed on said back of said timepiece and said bottom of said recess to permit the timepiece to be secured to the recess in the block.

9. The timer of claim 8, further comprising an on/off switch for said timer, wherein said on/off switch is disposed adjacent said handlebar grip to permit a rider to operate the throttle and the on/off switch without moving the hand of a rider.

10. The timer of claim 9, further comprising an electrical wire connecting said timer to said on/off switch to permit the timepiece to be operated by a rider.

11. The timer of claim 9, wherein said timepiece has a lighted face to permit a rider to view the timepiece in the dark.

12. The timer of claim 11, wherein said block of pliable material is cylindrically shaped to permit the block to be attached to a horizontal reinforcement bar of a wheeled vehicle.

13. The timer of claim 12, wherein said aperture is circular shaped to accommodate circular timepieces.

14. The timer of claim 13, wherein said aperture is elliptically shaped to accommodate elliptical timepieces.

* * * * *